United States Patent
Monier

[19]

[11] Patent Number: 6,163,790
[45] Date of Patent: Dec. 19, 2000

[54] MODULAR ARITHMETIC COPROCESSOR COMPRISING AN INTEGER DIVISION CIRCUIT

[75] Inventor: Guy Monier, Rognac, France

[73] Assignee: SGS-Thomson Microelectronics S.A., Gentilly, France

[21] Appl. No.: 09/101,615

[22] PCT Filed: Jan. 9, 1997

[86] PCT No.: PCT/FR97/00035

§ 371 Date: Jul. 9, 1998

§ 102(e) Date: Jul. 9, 1998

[87] PCT Pub. No.: WO97/25668

PCT Pub. Date: Jul. 17, 1997

[30] Foreign Application Priority Data

Jan. 12, 1996 [FR] France .................................. 96 00640

[51] Int. Cl.[7] .................................................. G06F 7/38
[52] U.S. Cl. ........................................................ 708/491
[58] Field of Search .................... 708/491–492

[56] References Cited

U.S. PATENT DOCUMENTS

| | | |
|---|---|---|
| 3,816,733 | 6/1974 | Sather . |
| 3,816,773 | 6/1974 | Baldwin et al. ................. 310/8.1 |
| 5,261,001 | 11/1993 | Dariel et al. .................... 380/30 |
| 5,448,639 | 9/1995 | Arazi ............................. 380/30 |
| 5,513,133 | 4/1996 | Cressel et al. .................. 364/754 |
| 5,912,904 | 6/1999 | Monier ........................... 708/491 |
| 5,948,051 | 9/1999 | Monier ........................... 708/492 |
| 5,987,489 | 11/1999 | Monier ........................... 708/492 |
| 5,999,953 | 12/1999 | Monier ........................... 708/491 |

FOREIGN PATENT DOCUMENTS

| | | |
|---|---|---|
| 0 502 782 A2 | 9/1992 | European Pat. Off. . |
| 0 566 498 A2 | 10/1993 | European Pat. Off. . |
| 0 601 907 A2 | 6/1994 | European Pat. Off. . |
| 892 112 | 3/1962 | United Kingdom . |

OTHER PUBLICATIONS

K, Hwang, *Computer Arithmetic*, 1979, pp. 218–221, XP 002022160.

R. Richards, *Arithmetic Operations in Digital Computers*, 1955, pp. 152–155, XP002022159.

K. Murata et al., Very High Speed Serial and Serial–Parallel Computers Hitac 5020 and 5020E, 1964 pp. 187–203. XP002022162.

*Primary Examiner*—Tan V. Mai
*Attorney, Agent, or Firm*—Wolf, Greenfield & Sacks, P.C.; James H. Morris; Theodore E. Galanthay

[57] ABSTRACT

A modular arithmetic coprocessor designed to perform computations according to the Montgomery method includes a division circuit to perform integer divisions. The integer division circuit computes the division of a binary data element A encoded on $n\mathbb{E}+n$ (bits by a binary data element B encoded on n bits, A, B, n, n' and n" being on-zero integers. For this function, the integer division circuit includes: a first n-bit register and a second n-bit register to contain the binary data element A and the result of the division, a third n-bit register to contain an intermediate result, a fourth n-bit register to contain the binary data element B, two subtraction circuits each having a first series input and a second series input and a series output, and a test circuit having an input and an output.

24 Claims, 3 Drawing Sheets

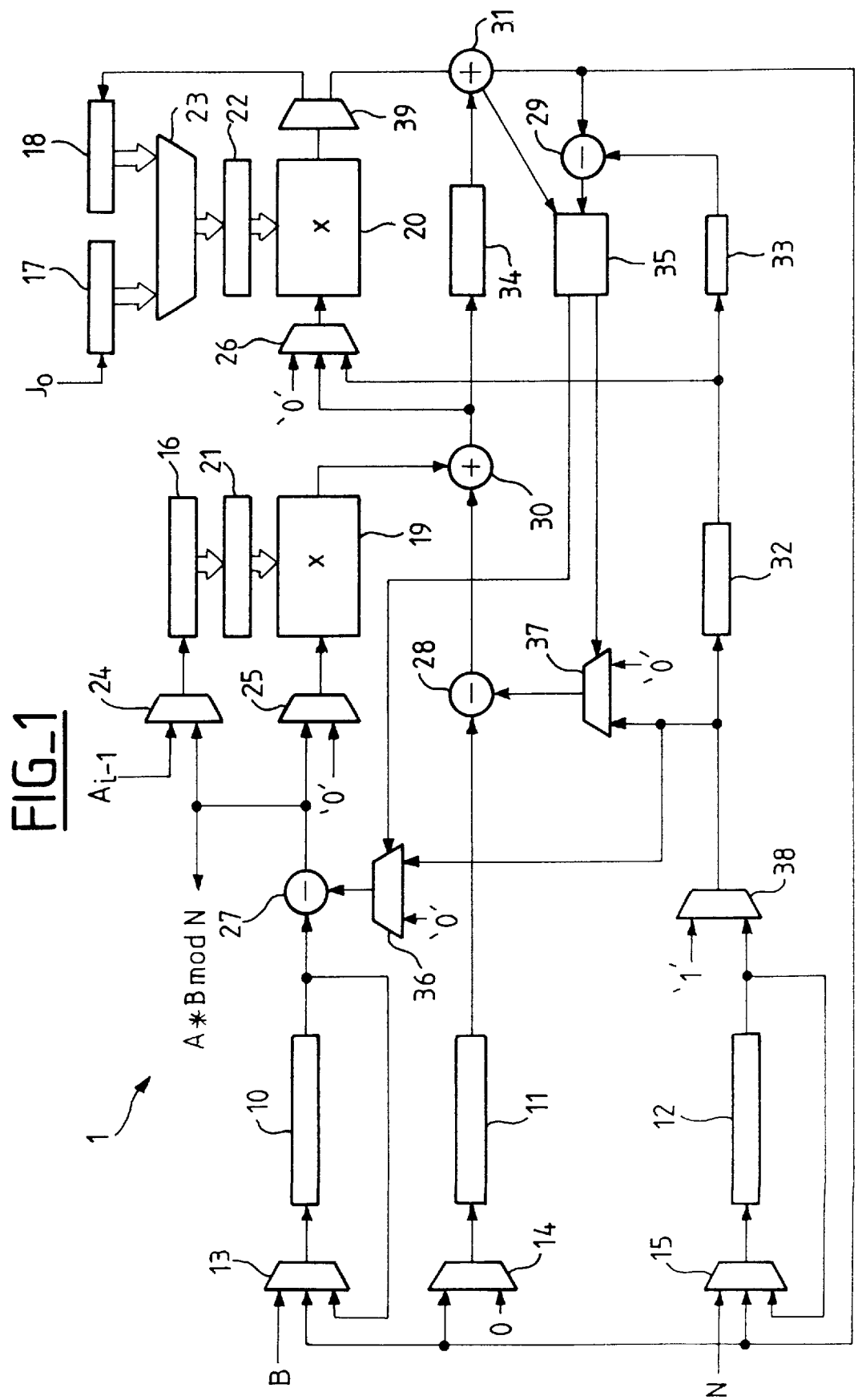
FIG_1

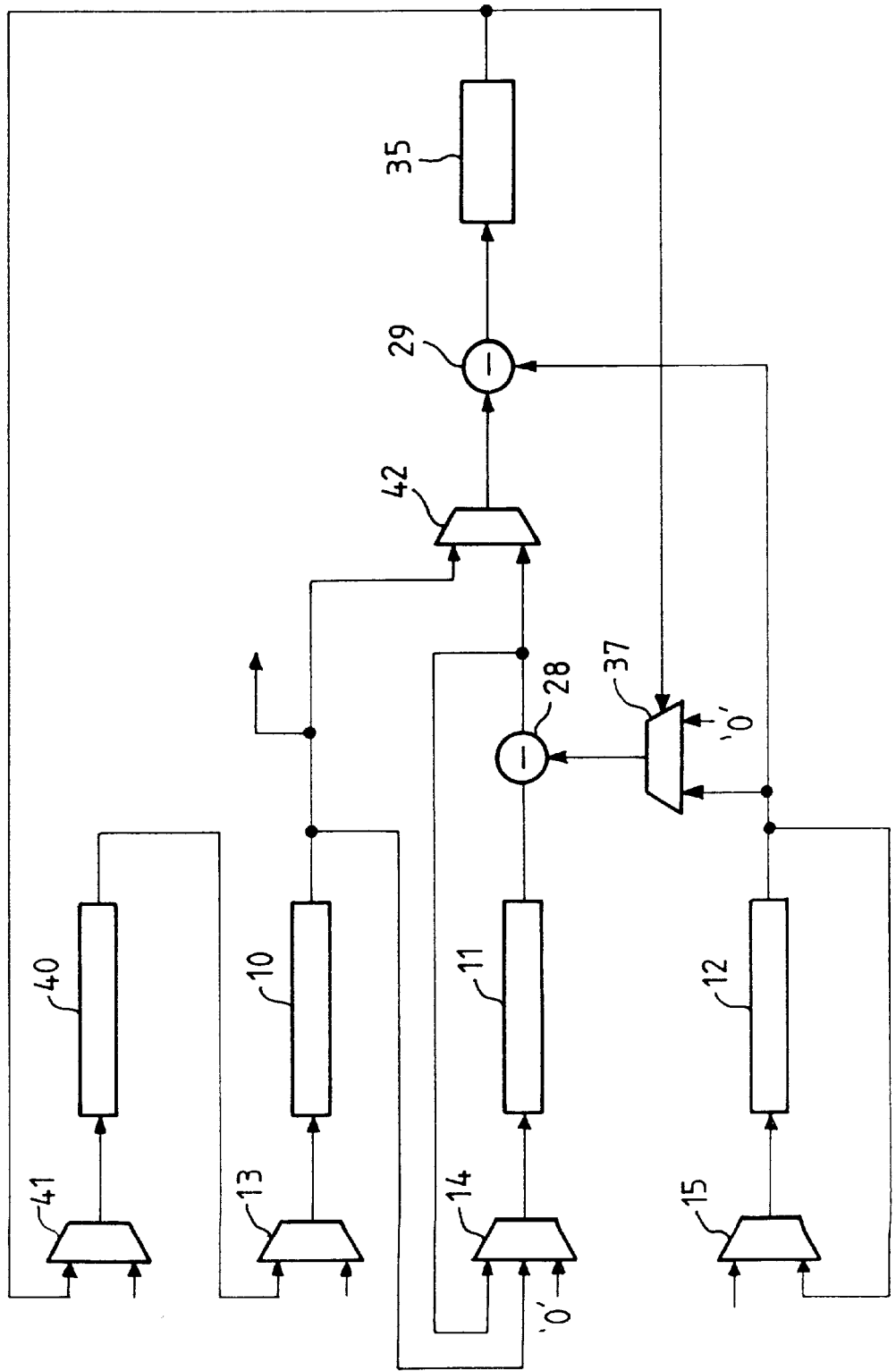

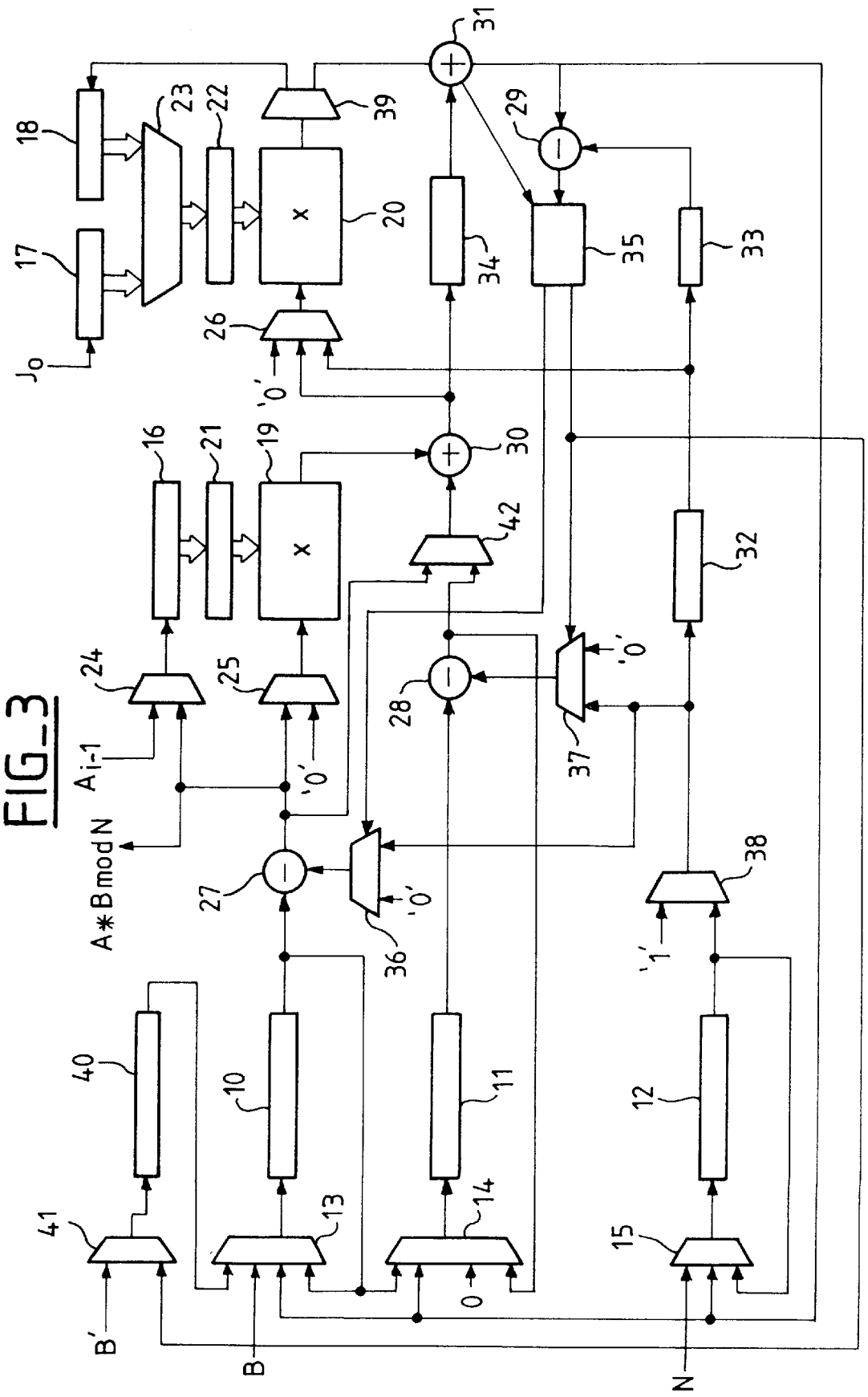
FIG_3

MODULAR ARITHMETIC COPROCESSOR COMPRISING AN INTEGER DIVISION CIRCUIT

The invention relates to a modular arithmetic coprocessor comprising an integer division circuit. Modular arithmetic coprocessors are used in encryption and/or decryption circuits. The use of these coprocessors enables the considerable acceleration of the operations of encryption and/or decryption using the Montgomery method. Systems of this kind are much used in chip cards using, in particular, the RSA code.

The RSA code is a mathematical encoding method where a binary message M encoded on n bits is processed as an integer of n bits. The encryption and decryption are achieved by modular exponentiation operations:

encryption: $M'=M^e$ mod N, decryption: $M=M'^d$ mod N.

M' is the encrypted message encoded on n bits, N is an integer encoded on n bits such that N=p*q, p and q being two prime numbers. The exponents e and d are two whole numbers such that (e*d) mod $\Phi(N)$*1, with $\Phi(N)=(p-1)*(q-1)$. A code of this kind therefore has two keys: one is an encryption key known as a public key (e and N) and the other is a decryption key called a secret key (d and N).

To find the secret key from the public key, it is enough to carry out the following operation: $d=(1+K*\Phi(N))/e$, K being an integer coefficient that is not zero. The security of a code of this kind actually relates to the complexity of the operations to be performed. To find the secret key, it is necessary to factorize N into prime numbers. The greater the numbers p and q, the greater is the amount of time required for this operation (in practice p and q are encoded on a few hundreds of bits). Indeed, it is necessary to make successive tests on the divisibility cf N by all the integers encoded on 2 to n/2 bits.

It is quite possible to look for a secret key on the basis of the public key, provided that several hundreds of years are devoted to the task. However, certain uses of RSA codes may require changes of key that call for a computation of the keys. Computations of this kind use operations of division on big numbers.

In chip cards, the encryption circuits make use of a microprocessor-coprocessor type of architecture. The microprocessor is a standard 8-bit or 16-bit type of microprocessor. The coprocessor is a modular arithmetic coprocessor, for example of the same type as the one described in the European patent application referenced EP-A-0 601 907 (hereinafter called D1). The coprocessor is illustrated in FIG. 1 (this figure corresponds to FIG. 2 of the European patent application referred to).

To carry out the division operations, the coprocessor is of no use. Therefore, the division takes place in the microprocessor. The fact of carrying out the division in the microprocessor requires a considerable amount of time because the microprocessor is not capable of directly processing large-sized data elements (for example 512 bits). Furthermore, the program that enables this division to be carried out will take up a considerable amount of memory space (a code associated with the program) and will use working memory space to perform its computations. For a chip card, it is therefore very difficult to be able to recompute keys from different public keys (e and N).

The invention proposes the addition, in an modular arithmetic coprocessor, of a computation circuit specially designed to perform divisions on big numbers. Since the division circuit does not have to use a large amount of additional space, this circuit uses resources common to the modular operations performed according to the Montgomery method which are already present in a modular arithmetic coprocessor. Thus, the fact of making a computation circuit specific to the division on the modular arithmetic coprocessor enables a chip card to carry out a computation of keys without any noteworthy increase in the size of the integrated circuit. The invention also proposes a method for the making of a division using a circuit of this kind.

An object of the invention therefore is a modular arithmetic coprocessor designed to perform computations according to the Montgomery method comprising a division circuit wherein the division circuit comprises a test circuit having one input and one output to perform integer divisions by numbers that are different from a power of two.

The invention more particularly describes an integer division circuit that computes the division of a binary code A encoded on 2* n bits by a binary data element B encoded on n'+n" bits, A, B, n, n' and n" being non-zero integers, the circuit comprising: a first n'-bit register and a second n"-bit register to contain the binary data element A and the result of a division, a third n-bit register to contain an intermediate result, a fourth n-bit register to contain the binary data element B.

Since the division circuit can be borre on several coprocessors, the invention also has as its object an arithmetic coprocessor comprising an integer division circuit that computes the division of a binary data element A encoded on n'+n" bits by a binary data element B encoded on n bits, A, B, n, n' and n" being non-zero integers wherein the integer division circuit comprises: a first n'-bit register and a second n"-bit register to contain the binary data element A and the result of the division, a third n-bit register to contain an intermediate result, a fourth n-bit register to contain the binary data element B, two cascade-connected subtraction circuits each having a first series input and a second series input and a series output, a test circuit having an input and an output.

An object of the invention also is a method for carrying out an integer division of a first number, encoded on n'+n" bits, by a second number encoded on n bits, using a modular arithmetic coprocessor comprising first, second, third and fourth n-bit shift registers, a first series subtraction circuit and a second series subtraction circuit, a test circuit wherein said method comprises the following steps:

E1: the loading, into the first and second registers, of the first number, the resetting of the third register with zeros, the loading into the fourth register of the second number, the resetting at zero of the test circuit, E2: the shifting, by one bit, of the third and fourth registers, the third register recovering, as a most significant bit, the most significant bit of the second register, the fourth register having its output connected to its input, the subtraction, in the second subtraction circuit, of the least significant bit of the fourth register from the most significant bit of the second register, the first subtraction circuit performing a subtraction of zero from the least significant bit of the third register, E3: the shifting by n−1 bits of the third and fourth registers, the output of the fourth register being connected to its input, the input of the third register being connected to the output of the first subtraction circuit, the subtraction, from the n−1 bits coming out of the third register, of zero in the first subtraction circuit, the subtraction, from the output of the result coming out of the first subtraction circuit, of the bits of the fourth register, E4: the storage of the last carry value of the second subtraction circuit in the test circuit and the production, at the output of this test circuit, of a binary data element whose value is equal to the complement of the memorized carry value, E5: the shifting by one bit of the first and second registers, the most significant bit of the first register being loaded as a least significant bit of the second register, the binary data element memorized in the test circuit being loaded as a least significant bit in the first register, E6: the resetting of the first and second subtraction circuits, E7: the repetition, 2*n−1 times, of the steps E2 to E6, the first subtraction circuit performing a subtraction, from the contents of the third register, of zero if the previously memorized carry value is equal to one, the first subtraction circuit performing a subtraction, from the contents of the third register, of the contents of the fourth register if the previously memorized carry value is equal to zero.

The invention will be understood more clearly and other features and advantages shall appear from the following description of an embodiment of the invention, given by way of an indication that in no way restricts the scope of the invention, with reference to the appended drawings, of which:

FIG. 1 gives a schematic view of a modular arithmetic coprocessor using the Montgomery method according to the art, FIG. 2 gives a schematic view of a division circuit according to invention, FIG. 3 a schematic view of a modular arithmetic coprocessor using the Montgomery method that possesses a division circuit according to the invention.

FIG. 1 gives a schematic view of a modular arithmetic coprocessor 1 for the processing of modular operations using the Montgomery method.

It comprises:

three shift registers 10, 11 and 12 with series input and output. Each of these registers has one and the same number n of cells, with n=m*k. These registers may be capable of being subdivided, for example into registers of n/2 cells and into registers of k bits for the registers 10 and 12;

multiplexers 13, 14 and 15 are placed respectively before the registers 10, 11 and 12. Multiplexers will also be placed before the subdivisions if these exist;

three registers 16, 17 and 18 each comprising k cells. The registers 16, 17 and 18 are registers with parallel outputs and series inputs;

two multiplication circuits 19 and 20 each comprising a series input, a parallel input and a series output. The parallel input of the multiplication circuit 19 is connected to the output of the register 16 by means of a storage flip-flop circuit 21 with k cells. The parallel input of the multiplication circuit 20 is connected to one of the outputs of the registers 17 or 18, by means of a storage flip-flop circuit 22 with k cells. This flip-flop circuit 22 is itself connected to one of the outputs of the registers 17 and 18 by means of a multiplexer with two parallel inputs and one parallel output;

multiplexers 24, 25, 37, 26, 36 and 38;

a demultiplexer 39;

series subtraction circuits 27, 28 and 29;

series addition circuits 30 and 31;

delay circuits 32, 33 and 34 to delay the propagation of binary data elements by k cycle periods;

a circuit 35 for the storage of comparison results.

For greater detail, reference may be made to the document D1 and especially to FIG. 3 of this document and to the extracts from the description pertaining thereto: page 15, line 54 to page 16, line 13, and page 17, line 50 to page 18, line 55.

The invention consists of the addition of a division circuit to this coprocessor 1. However, so as not to increase the size of this coprocessor excessively, the division circuit has elements already present in this coprocessor. Thus, the division circuit shown in FIG. 2 has:

four n-bit shift registers 10, 11, 12 and 40, in the present exemplary embodiment, each having one input and one series output, six multiplexers 13, 14, 15, 37, 41 arid 42, the outputs of the multiplexers 13, 14, 15 and 41 being connected respectively to the inputs of the registers 10, 11, 12 and 40, the output of the multiplexer 37 being connected to the second input of the subtraction circuit 28 and the output of the multiplexer 42 being connected to the first input of the subtraction circuit 29, these multiplexers being used to set up different connections needed for the working of the circuit, two subtraction circuits 28 and 29, each having two inputs and one series output, these circuits performing bit-by-bit subtraction operations synchronously. The document D1 in FIG. 8 shows an embodiment of these subtraction circuits 28 and 29), a test circuit 35 having one input and one output (in fact only one input and one output are necessary for the division circuit, although this circuit 35 has two inputs and two outputs).

For the division circuit, several connections are made. Some of them may be wired directly and. others by means of the multiplexer 13, 14, 15, 37, 41 and 42. However, certain connections may be made by means of elements of this coprocessor 1 that are rendered transparent (namely inoperative) and are not shown in FIG. 2.

Thus we have:

the output of the register 40 connected to the input of the register 10 by means of the multiplexer 13, the output of the register 10 connected to the input of the register 11 by means of the multiplexer 14, the output of the register 10 connected to the input of the subtraction circuit 29 by means of the multiplexer 42, the output of the subtraction circuit 28 connected to the input of the register 11 by means of the multiplexer 14, the output of the register 11 connected to the first input of the subtraction circuit 28, the output of the register 12 connected to its input by means of the multiplexer 15, the output of the register 12 connected to the second input of the subtraction circuit 28 by means of the multiplexer 37, the output of the register 12 connected to the second input of the subtraction circuit 29, the output of the subtraction circuit 28 connected to the first input of the subtraction circuit 29 by means of the multiplexer 42, the output of the subtraction circuit 29 connected to the input of the test circuit 35, the output of the test circuit 35 connected to the input of the register 40 by means of the multiplexer 41, the output of the test circuit 35 connected to a selection input of the multiplexer 37, the second input of the subtraction circuit 28 connected to a logic zero by means of the multiplexer 37, the input of the register 11 connected to a logic zero by means of the multiplexer 14, the input of the register 12 connected to a first input terminal by means of the multiplexer 15, the input of the register 12 connected to a second input terminal by means of the multiplexer 13, the input of the register 40 connected to a third input terminal by means of the multiplexer 41, and the output of the register 10 connected to an output terminal.

With the above-described device, it is possible to carry out an integer division of a first number encoded on 2* n bits by a second number encoded on n bits, the result being encoded on 2* n bits. For this purpose, the following steps are performed:

E1: the loading into the registers 40 and 10 of the first number, the register 40 containing the n low-order bits of this first number and the register 10 containing the n high-order bits of this first number, each of these registers 40 and 10 having its most significant bit towards its output and its least significant bit towards its input, the resetting of the register 11 with zeros, which amounts to loading zeros into this register 11, the loading into the register 12 of the second number, the least significant bit being close to the output and the most significant bit being close to its input, the resetting of the test circuit, in order to carry out the connection of the second input of the subtraction circuit 28 with a logic zero, the resetting at zero of the subtraction circuits 28 and 29, E2: the shifting by one bit of the registers 11 and 12, the register 11 recovering the most significant bit of the register 10 as a most significant bit, the register 12 having its output connected to its input, subtraction in the subtraction circuit 29 of the least significant bit of the register 12 from the most significant bit of the register 10, the subtraction circuit 28 performing a subtraction, from the least significant bit of the register 11, of zero, E3: the shifting by n−1 bits of the registers 11 and 12, the output of the register 12 being connected to its input, the input of the register 11 being connected to the output of the subtraction circuit 28, the subtraction, from the n−1 bits coming out of the register 11, of zero in the subtraction circuit 28, the subtraction, from the output of the result coming out of the subtraction circuit 28, of the bits of the register 12 in the subtraction circuit 29, E4: the storage of a binary data element equal to the complement of the last carry value of the subtraction circuit 29 into the test circuit 35 and the production, at the output of this test circuit 35, of the binary data element, E5: the shifting, by one bit, of the registers 40 and 10, the most significant bit of the register 40 being loaded as a least significant bit of the register 10, the binary data element stored in the test circuit 35 being loaded as a least significant bit in the register 40, E6: the resetting of the subtraction circuits 28 and 29, E7: the repetition, 2*n−1 times, of the steps E2 to E6, the subtraction circuit 28 performing a subtraction, from the contents of the register 11, of zero if the binary data element stored is equal to zero, the subtraction circuit 28 performing a subtraction, from the contents of the register 11, of the contents of the register 12 if the memorized binary data element is equal to one, E8: the retrieval of the result at the output terminal by the shifting, by 2*n bits, of the registers 40 and 10, the output of the register 40 being connected to the input of the register 10, the most significant bit coming out first, the remainder of the division being present in the register 11.

A few comments need to be made on certain steps for a clearer understanding of what is done. The step E1 corresponds to the loading of the data elements and to resetting. The loading of the first number may be done in two different ways, either at two input terminals simultaneously in the registers 40 and 10 or by the third input terminal, the register 10 being loaded by means of the register 40. It is also possible to include, in this step, different operations for the resetting of elements of the coprocessor 1 which needs to be rendered transparent for the efficient operation of the division circuit.

The steps E2, E3 and E4 amount to:

the subtraction in the subtraction circuit 38, from an intermediate result contained in the register 11, of the second number contained in the register 12 if the intermediate result is greater than the second number, the multiplication by two of the result of the subtraction performed in the subtraction circuit 28 and the addition thereto of the most significant bit of the register 10, and then the storage in the register 11 of this new intermediate result, the comparison of the new intermediate result, while it is being produced, with the second number by subtraction in the circuit 29, and the storage of a binary data element representing the comparison that corresponds to the complement of the last carry value coming from the subtraction of the subtraction circuit 29, this binary data element being equal to "one" if the new intermediate result is greater than or equal to the second number or being equal to zero if the new intermediate result is smaller than the second number.

The step E4 may be identified with the last shift of the shift E3. This requires a few modifications of the subtraction circuit 29 that those skilled in the art will be capable of performing. The modifications will be aimed at obtaining the output of the carry value by anticipation.

The step E5 is used to store the binary data element as being a bit of the result of the division and shifts all the bits of the first number thus changing the most significant bit to be considered. This step may be performed during one of the steps E2, E3 or E4. In this case, it is necessary to add a step E5 after the step E7.

The step E6 is used to eliminate the carry values of the previous subtraction operations. It may be done asynchronously, immediately after the storage of the binary data element.

A status report of the time used indicates that, in the most favorable cases:

the step E1 uses n clock cycles, the step E2 uses 1 clock cycle, the step E3 uses n−1 clock cycles, the step E4 uses 1 clock cycle, the step E5 uses 1 clock cycle, the step E6 uses 1 clock cycle, the step E7 uses 2*n−1 times the steps E2 to E6, giving (2*n−1)*(n+3) clock cycles, the step E8 uses 2*n clock cycles.

This leads to a total of 2*n*(n+4)+n clock cycles. 3*n cycles are needed for the exchange of data between the coprocessor and the memory. It is known that the access times for the memories are sometimes lengthy if one and the same clock frequency is used for the loading and the processing. This clock frequency must therefore depend on the access time of the memory. The invention proposes the use of two clock frequencies, one for the loading and one for the processing, in order to overcome this problem.

Other modifications that result from the simultaneous nature of certain steps enables a diminishing of the total number of cycles up to a maximum of 6* n clock cycles.

It can be seen in the time status report that the n-bit size of the registers affects the number of clock cycles needed to carry out the division. This influence will be minimized inasmuch as the first and second numbers have a real size close to the maximum size of the registers. In order that this may be true in a large number of cases, it is possible to use registers of variable size. Those skilled in the art could, for example, draw inspiration from registers shown in the document D1 in FIG. 3, by using a greater number of divisions of each register.

Thus, it is possible to have a register 40 with a size n', a register 10 with a size n", and registers 11 and 12 with a size n(3). The modification of the method is limited in the step E3 to carrying out a shift of n(3)−1 bits instead of n−1 bits and in the step E7 to repeating the steps n'+n" times instead of 2* n times.

In FIG. 3, the division circuit of FIG. 2 has been added to the coprocessor 1 of FIG. 1. FIG. 3 shows only one example of integration among several possibilities.

As compared with the coprocessor 1 of FIG. 1, the register 40 and the multiplexers 41 and 42 have been added. Furthermore, certain elements already present have been modified. Thus, the multiplexer 13 has an additional input connected to the output of the register 40. The multiplexer 14 has two additional inputs, one connected to the output of the register 10 and the other connected to the output of the subtraction circuit 28. Other elements are modified in a non-visible way in FIG. 3. The test circuit 35 is designed to detect carry values. The output which is connected to the selection input of the multiplexer 37 must be provided with an inverter to verify the functionality of the division circuit. This also leads to a reversal of the inputs of the multiplexer 37. The delay circuits 32, 33 and 34 have no use for the division. They are modified to give rise to both zero delays and to the delays needed for the running of modular operations. It is, possible for example to add multiplexers to the delay circuits 32, 33 and 34 in order to shunt them.

In the circuit, as modified, certain elements of the coprocessor have to be made transparent. Thus, during the running of a division, the multiplexers 25, 26 and 36 have to make a connection between their outputs and their inputs connected to logic zeros. The multiplexer 38 must make a connection between its output and the output of the register 12.

Modifications of the progress of the division operation must be provided for. The adders 30 and 31 each add a delay of one clock cycle. The subtraction circuit 27 prompts a delay that must be compensated for by an anticipation of one clock cycle on the step E2.

To avoid this anticipation of one cycle of the step E2, it is possible to connect the input of the multiplexer 42 upline with respect to the subtraction circuit 27. It is also possible to place the multiplexer 42 downline with respect to the adder 30.

To avoid having an input of the multiplexer 14 connected to the output of the subtracter circuit 28, it is possible to shift the multiplexer 42 between the adder 31 and the subtraction circuit 29. The connection of the output of the subtraction circuit 28 to the input of the register 11 is done by means of the addition circuit 31 whose output is already connected to an input of the multiplexer 14. With a modification of this kind, the step E2 must be delayed by one or two clock cycles depending on whether the connection between the multiplexer 42 and the output of the register 10 is done downline or upline with respect to the subtraction circuit 27.

One improvement may also be contemplated by modifying the adders 30 and 31 so that they do not prompt any additional delay cycles.

These few examples of possible modifications with respect to FIG. 3 will enable those skilled in the art to achieve the invention according to preference. Those skilled in the art could also use other possibilities of integration without departing from the framework of the invention.

What is claimed is:

1. A modular arithmetic coprocessor designed to perform computations according to the Montgomery method comprising a division circuit, the division circuit comprising a test circuit having one input and one output to perform integer divisions by numbers that are different from a power of two, wherein the integer division circuit computes the division of a binary code A encoded on n'+n" bits by a binary data element B encoded on n bits, A, B, n, n' and n" being non-zero integers, and wherein the integer division circuit comprises:

a first n'-bit register and a second n"-bit register to contain the binary data element A and the result of the division, an output of the first register being connected to an input of the second register, the output of the test circuit being connected to the input of the first register;

a third n-bit register to contain an intermediate result, an output of the second register being connected to an input of the third register;

a fourth n-bit register to contain the binary data element B, the output of the fourth register is connected to its input; and two cascade-connected subtraction circuits each having a first series input and a second series input and a series output, the output of the third register is connected to the first input of the first subtraction circuit; the output of the fourth register is connected to the second input of the second subtraction circuit; the output of the second subtraction circuit is connected to the input of the test circuit; the output of the second register is connected to the first input of the second subtraction circuit; the output of the first subtraction circuit is connected to the input of the third register; the output of the fourth register is connected to the second input of the first subtraction circuit; the output of the first subtraction circuit is connected to the first input of the second subtraction circuit.

2. A coprocessor according to claim 1, wherein the first, second, third and fourth registers are shift registers.

3. A coprocessor according to claim 1, wherein:

the second input of the first subtraction circuit is connected to a logic zero, the input of the first register is connected to an output of a first multiplexer, the first multiplexer having two inputs respectively connected to the output of the test circuit and to a first input terminal, the input of the second register is connected to an output of a second multiplexer, the second multiplexer having two inputs respectively connected to the output of the first register and to a second input terminal, the input of the third register is connected to an output of a third multiplexer, the third multiplexer having an input connected to the output of the second register and receiving a logic zero on a second input, the input of the fourth register is connected to an output of a fourth multiplexer, the fourth multiplier having a first input connected to its output and a second input connected to a third input terminal, the second input of the first subtraction circuit is connected to an output of a fifth multiplexer;

the first input of the second subtraction circuit is connected to an output of a sixth multiplexer; and a selection input of the fifth multiplexer is connected to the output of the test circuit.

4. A coprocessor according to claim 1, wherein the cells of the first and second registers placed close to the output of said first and second registers and the cells of the third and fourth registers placed close to the input of said third and fourth registers receive the most significant bits of the data elements contained therein.

5. A coprocessor according to claim 1, wherein the first, second, third and fourth registers are of variable sizes.

6. A coprocessor according to claim 1, wherein the first, second, third and fourth registers have an identical n-bit size.

7. A coprocessor according to claim 1, wherein the test circuit comprises a storage element designed to memorize a carry value coming from the second subtraction circuit, and wherein the output of the test circuit gives a data element corresponding to a complement of this carry value.

8. A coprocessor according to claim 1, wherein the remainder of the division is contained in the third register.

9. A coprocessor according to claim 1 wherein the output of the test circuit is connected to the input of the first register.

10. A method for carrying our-an integer division of a first number, encoded on n'+n" bits, by a second number, encoded on n bits, by means of a modular arithmetic coprocessor comprising:

a first n-bit shift register, a second n-bit shift register, a third n-bit shift register and a fourth n-bit shift register, a first series subtraction circuit and a second series subtractiorL circuit, a test circuit, wherein said method comprises the following steps:

E1: the loading, into the first and second registers, of the first number, the resetting of the third register with zeros, the loading into the fourth register of the second number, the resetting at zero of the test circuit and of the subtraction circuits, E2: the shifting, by one bit, of the third and fourth registers, the third register recovering, as a most significant bit, the most significant bit of the second register, the fourth register having its output connected to its input, the subtraction, in the second subtraction circuit, of the least significant bit of the fourth register from the most significant bit of the second register, the first subtraction circuit performing a subtraction of zero from the least significant bit of the third register, E3: the shifting by n−1 bits of the third and fourth registers, the output of the fourth register being connected to its input, the input of the third register being connected to the output of the first subtraction circuit, the subtraction of zero from the n−1 bits coming out of the third register in the first subtraction circuit, the subtraction, from the output of the result coming out of the first subtraction circuit, of the bits of the fourth register, E4: the storage of the last carry value of the second subtraction circuit in the test circuit and the production, at the output of this test circuit, of a binary data element whose value is equal to the complement of the memorized carry value, E5: the shifting by one bit of the first and second registers, the most significant bit of the first register being loaded as a least significant bit of the second register, the binary data element memorized in the test circuit being loaded as a least significant bit in the first register, E6: the resetting of the first and second subtraction circuits, E7: the repetition, 2*n−1 times, of the steps E2 to E6, the first subtraction circuit performing a subtraction, from the contents of the third register, of zero if the previously memorized carry value is equal to one, the first subtraction circuit performing a subtraction, from the contents of the third register, of the contents of the fourth register if the previously memorized carry value is equal to zero.

11. A method according to claim 10, wherein the steps; run during other steps.

12. A modular arithmetic coprocessor designed to perform computations according to the Montgomery method comprising a division circuit, the division circuit Comprising a test circuit having one input and one output to perform integer divisions by numbers; that are different from a power of two, wherein the integer division circuit computes the division of a binary code A encoded on n'+n" bits by a binary data element B encoded on n bits, A, B, n, n' and n" being non-zero integers, and wherein the integer division circuit comprises:

a first n'- bit register and a second n"-bit register to contain the binary data element A and the result of the division, a third n-bit register to contain an intermediate result, a fourth n-bit register to contain the binary data element B, two cascade-connected subtraction circuits each having a first series input and a second series input and a series output a first input terminal coupled to the input of the first register, a second input terminal coupled to the input of the second register, the output of the first subtraction circuit is connected to the input of the third register, a third input terminal coupled to the input of the fourth register, said subtraction circuits receiving at inputs outputs from said second, third and fourth registers, and the output of the second subtraction circuit is connected to the input of the test circuit.

13. A coprocessor according to claim 12, wherein:

the output of the third register is connected to the first input of the first subtraction circuit, and the output of the fourth register is connected to the second input of the second subtraction circuit.

14. A coprocessor according to claim 13, wherein:

the output of the first register is connected to the input of the second register and the output of the second register is connected to the input of the third register.

15. A coprocessor according to claim 14, wherein:

the output of the second register is connected to the first input of the second subtraction circuit and the output of the fourth register is connected to its input.

16. A coprocessor according to claim 15, wherein:

the output of the fourth register is connected to the second input of the first subtraction circuit and the output of the first subtraction circuit is connected to the first input of the second subtraction circuit.

17. A coprocessor according to claim 16, wherein:

the output of the test circuit is connected to the input of the first register.

18. A coprocessor according to claim 17, further including first, second, third, fourth fifth and sixth multiplexers.

19. A coprocessor according to claim 18, wherein:

the input of the first register is connected to an output of the first multiplexer and the input of the second register is connected to an output of the second multiplexer.

20. A coprocessor according to claim 19, wherein:

the input of the third register is connected to an output of the third multiplexer and the input of the fourth register is connected to an output of a fourth multiplexer.

21. A coprocessor according to claim 20, wherein:

the second input of the first subtraction circuit is connected to an output of a fifth multiplexer and the first input of the second subtraction circuit is connected to an output of the sixth multiplexer.

22. A coprocessor according to claim 21, wherein:

a selection input of the fifth multiplexer is connected to the output of the test circuit.

23. A coprocessor according to claim 12, wherein:

the second input of the first subtraction circuit is connected to a logic zero.

24. A coprocessor according to claim 23, wherein:

the input of the third register is connected to a logic zero.

\* \* \* \* \*

UNITED STATES PATENT AND TRADEMARK OFFICE
CERTIFICATE OF CORRECTION

PATENT NO. : 6,163,790
DATED : December 19, 2000
INVENTOR(S) : Guy Monier

It is certified that error appears in the above-identified patent and that said Letters Patent is hereby corrected as shown below:

In column 1, line 18 should read as shown below:

decryption: $M = M'^d \mod N$

Signed and Sealed this

Twenty-ninth Day of May, 2001

Attest:

NICHOLAS P. GODICI

*Attesting Officer*  *Acting Director of the United States Patent and Trademark Office*